UNITED STATES PATENT OFFICE.

GEOFFROY LE ROY DE LENCHÈRES, OF VIERZON, FRANCE.

COMPOSITION OF MATTER.

SPECIFICATION forming part of Letters Patent No. 702,140, dated June 10, 1902.

Application filed December 26, 1901. Serial No. 87,265. (No specimens.)

*To all whom it may concern:*

Be it known that I, GEOFFROY LE ROY DE LENCHÈRES, inventor, a citizen of the Republic of France, residing at Bel Air, Vierzon, Cher, in the Republic of France, have invented a new or Improved Composition of Matter, of which the following is a specification.

This invention relates to a new or improved composition of matter adapted to be utilized for a variety of purposes, and particularly for use in the construction of maritime work, dry-docks, fortifications, canals, dikes, sluices, foundations of bridges, pillars, cellar-walls, channels, pipes, conduits, troughs, drainage-holes, water-closets, flagstones, and curbs.

The improved composition is composed of simple or double salts of alumina and potash, especially the silicates, silica, oxid of manganese, sulfate of lime and sulfate of baryta, carbureted hydrogen extracted from coal, oil of schist, coal-tar, bog-head, asphalt, natural or artificial liquid bitumen, and gravel and flint. The proportions of these various materials depend on the qualities which it is desired to impart to the final product. The proportions may be, for example, by weight, as follows: clay, sixty to seventy per cent.; tar, twenty-two to thirty-five per cent.; gypsum, two to three per cent.; sulfate of baryta, one to two per cent.; silica, three to five per cent.; oxid of manganese, five to eight per cent. These substances are introduced into a suitable heating vessel, such as is employed in the manufacture of asphalt, and heated to a temperature of between 200° and 300°, according to the use for which the product is intended, and allowed to cool. The resulting mass is in a more or less elastic or rigid state. In the first case it resists high temperatures less than in the second. Gravel or small stones may be mixed with the materials while heated. The mass has nothing in common with that from which bricks are made, but resembles more that from which asphalt is made. It is transported to the place of use in suitable heating vessels and heated slightly before using, so as to soften the mass, without, however, boiling the same or affecting its composition, but simply for the purpose of permitting manipulation, casting, or application of the same.

Most of the above-mentioned substances are found in the earth, and as to the other substances their mixture with the former is designed to impart rigidity, elasticity, molecular cohesion, and resistance to heat and stress to which the composition may be subjected.

External constructions subjected to the action of heat require an elasticity and rigidity different from constructions beneath ground, such as in basements and the like. In certain cases the volume of the composition may be reduced and economy effected by increasing either the rigidity or the elasticity of the material. Thus, for example, a dike requires more rigidity and less elasticity than a reservoir, a paving-stone, or a joint. These various conditions render necessary reductions or augmentations in the proportions of the materials designed to act on the mass of inert material. As to the bituminous materials they may be variously modified by means of heat before mixing with the other substances. By this means can be obtained various classes of materials, which may be ranged according to the uses to which they are required.

My new or improved composition contains no carbonate of lime or Spanish or Meudon chalk, which forms the base of all bitumens known as "natural" or "artificial."

Among the various substances of the mixture some produce and others support by their reciprocal affinity the molecular attractions. The more or less complete conversion insures, more or less, the adherence and homogeneity of the agglomerate.

Contrary to usual practice the entire mixture may be placed *en bloc* into the vessel or boiler, so that all the molecules are subjected to a uniform heat for the whole period of baking. In this manner a considerable economy in heat fuel, time, and flux is effected.

What I claim, and desire to secure by Letters Patent of the United States, is—

The herein-described composition of matter, consisting of a heated and cooled mixture of simple or double salts of alumina and potash, silica, oxid of manganese, sulfate of lime, sulfate of baryta, a hydrocarbon, and gravel, substantially as set forth.

In testimony whereof I have hereunto set my hand, in presence of two subscribing witnesses, this 11th day of December, 1901.

GEOFFROY LE ROY DE LENCHÈRES. [L. S.]

Witnesses:
HENRI DATHY,
RAYMOND DU VERRIES.